United States Patent
Aurzada et al.

[11] Patent Number: 5,930,942
[45] Date of Patent: Aug. 3, 1999

[54] FISH CATCHER FISHING LURE

[76] Inventors: John Leonard Aurzada; Clayton Marion Aurzada, both of 431 Carriage Dr., Cheyenne, Wyo. 82009

[21] Appl. No.: 08/931,385

[22] Filed: Sep. 16, 1997

[51] Int. Cl.[6] .................................................. A01K 85/14
[52] U.S. Cl. .............................................. 43/42.5
[58] Field of Search ........................ 43/42.5, 42.52

[56] References Cited

U.S. PATENT DOCUMENTS

| | | | |
|---|---|---|---|
| 2,065,246 | 12/1936 | Saarinen | 43/42.5 |
| 2,481,710 | 9/1949 | Arndt | 43/42.52 |
| 2,570,474 | 10/1951 | Novitzky | 43/42.5 |
| 2,712,195 | 7/1955 | Belcher | 43/42.5 |
| 2,800,739 | 7/1957 | Manzi | 43/42.5 |
| 2,889,657 | 6/1959 | Bowman | 43/42.5 |

*Primary Examiner*—Jack W. Lavinder

[57] ABSTRACT

A fishing lure made of a single piece of rigid brass or other type of metal which channels water by means of a bend in the lure's surface through substantially half-circle and notch shaped channels. This gives the lure a unique oscillation and tumbling motion when it is pulled through water by a fishing line attached to the lure's end. The lure's surface is also beveled and scored to produce spots which are substantially circular and to produce lines. These spots and lines reflect light and increase the lure's attractiveness to fish.

1 Claim, 3 Drawing Sheets

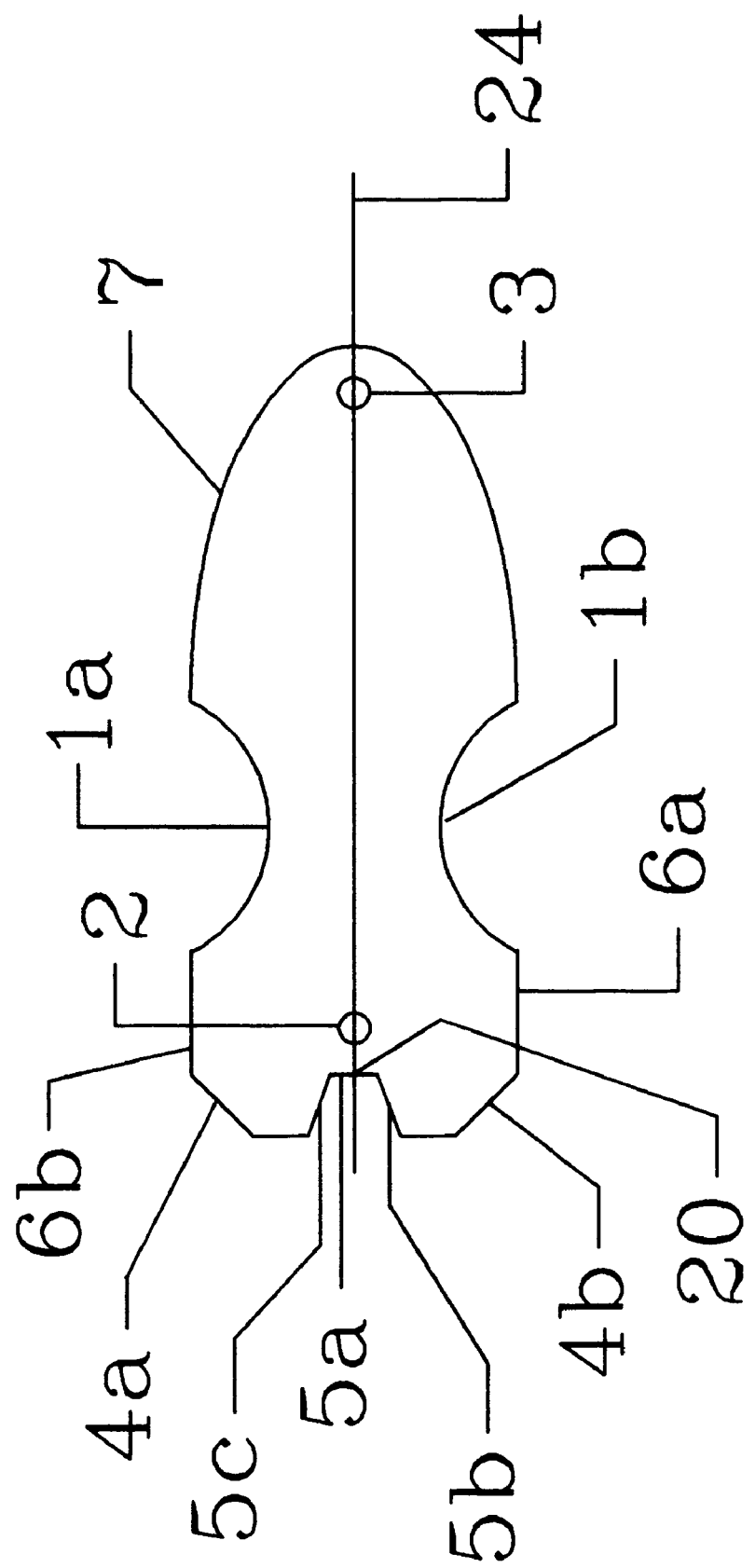

FISH CATCHER FISHING LURE

BACKGROUND OF THE INVENTION

1. Field of Invention

This invention relates to metal, brass or chrome-plated brass, fishing lures and specifically to lures which are designed for attracting and catching trout and other game fish in either open water, lakes, ponds, streams, rivers, or other bodies of water.

2. Description of Related Art Including Information Disclosed Under 37 CFR 1.97 and 37 CFR 1.98

After making a review of the relevant prior art, Applicant has located no prior art that specifically included the novel features embodied by the present invention.

SUMMARY OF THE INVENTION

Fishing and outdoor stores commonly supply consumers with metal lures which are designed to attract and catch trout and other game fish. These lures commonly are made of brass, steel, or some other metal in a shape which causes the metal to oscillate or tumble through the water when pulled by a fishing line made of various materials, which are not part of the present invention.

Although many fishing lures have been designed, these lures fail in their primary duty to catch trout and other game fish because their oscillation or tumbling motions are inadequate or not appealing to the fish.

This invention responds to the need for a lure, which is more likely to attract fish because of a unique oscillation and tumbling action obtained when the lure is pulled through water by a fishing line.

This invention also includes a design which reflects light from many angles produced by scoring and beveling of the lure's surface, rather than a smooth or dimpled surface.

Moreover, the present invention includes a unique hook location in which the hook is attached to the lure by means of a split-ring or other attachment device which is attached to a hole in the lure, and the hole is set-off from the lure's end by means of a notch in the lure's end. This provides for a more compact design and enables the lure to hook a greater number of fish because the hook is closer to the lure.

This invention also includes a design where the attachment device, which attaches a hook, is at a location forward of the tail section. This design allows the hook to be closer to the lure during operation.

The manner of using the lure described herein is identical to that for lures in present use. Namely, the lure is attached a fishing line, thrown or cast into a body of water using a fishing pole, and reeled back to the fishing pole at a moderate pace, which may be varied according to fishing and water conditions.

Accordingly, the lure described in this application can be used as an ordinary lure. However, the lure in this case has the additional advantages in that:

(1) It permits the hook to remain closer to the lure.

(2) It permits the lure to reflect light at a greater number of angles by beveling or scoring of the lure's surface in shapes which are both substantially circular or linear in order to increase lure's ability to attract and catch fish.

(3) It provides a unique oscillation and tumbling motion in the water because of the bend in the lure's surface.

(4) It provides a unique oscillation and tumbling motion in the water because of substantially half-circle water channels and other notches in the lure's edge.

Although the description above contains many specifications, these should not be construed as limiting the scope of the present invention but as merely providing illustrations of some of the presently preferred embodiments of this invention. For example, the present invention can be painted different colors or can be made of other types of metal, etc. The present invention may also be treated with materials which make it compatible with salt-water fishing conditions such as corrosion inhibitors.

Thus the scope of the invention should be determined by the appended claims and their legal equivalents, rather than by the examples given.

Accordingly, in addition to the objects and advantages of the fishing lure described above, other objects and advantages of the present invention are:

(a) to provide a fishing lure with an oscillation and tumbling motion which is appealing to trout and other game fish and increases the angler's chance of catching one of these fish;

(b) to provide a fishing lure which is substantially thicker than current models making it more compact and of a smaller size which is easier to maneuver and cast;

(c) to provide a fishing lure of a design unlike other models and which is more likely to attract and catch fish;

(d) to provide a fishing lure which can be bright or dark colored and may be used in a variety of fishing conditions depending upon the lighting conditions encountered by the angler;

(e) to provide a fishing lure with bevels, lines, and other scoring or alteration of the metal's otherwise smooth surface which increase the fishing lure's attractiveness by reflecting light;

(f) to provide a fishing lure which simulates a small fish breaking the surface of the water when it lands on the water after being cast;

(g) to provide a fishing lure with a reflective pattern which produces a bright appearance from many angles on a beveled and scored surface rather than a smooth surface which provides reflectivity from a more limited number of angles; and (h) to provide a fishing lure where the hook is attached more closely than other lures, which provides for superior performance in hooking fish.

Further objects and advantages are to provide a lure which can be used easily and conveniently. The lure being compact and designed in such a manner as to attract trout and other game fish and increasing an angler's chance of catching these fish.

BRIEF DESCRIPTION OF THE DRAWING

FIG. 1A is a top view of the present invention. For clarity, this figure does not depict the line 12, attachment device 13, or hook 14 which are more clearly shown in FIG. 1C. However, the completed and preferred embodiment of the present invention will contain all components depicted in FIGS. 1A, 1B, and 1C.

DESCRIPTION OF THE PREFERRED EMBODIMENTS

Figure 1B:
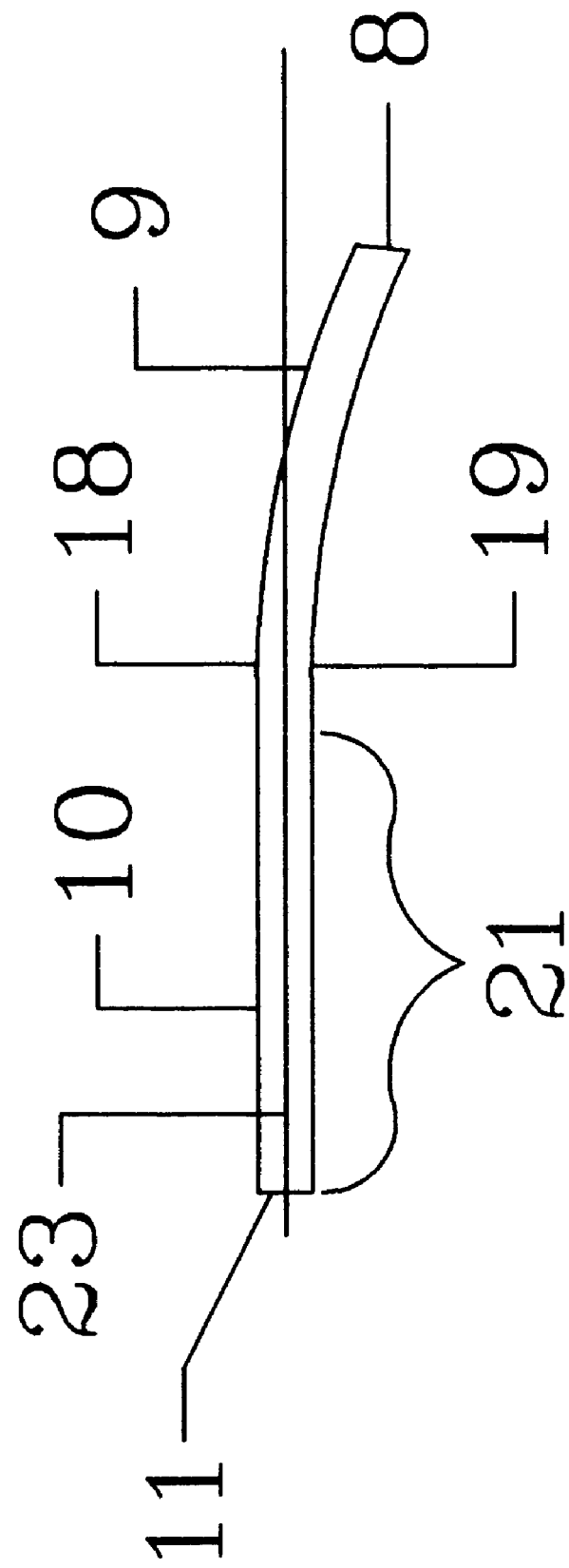
FIG. 1B is a side view of the present invention. In this figure, the fishing line 12, attachment device 13, and hook 14 have not been shown in order to more clearly illustrate the relationship between bend 9, flat portion 10, and ends 8 and 11.
Figure 1C:
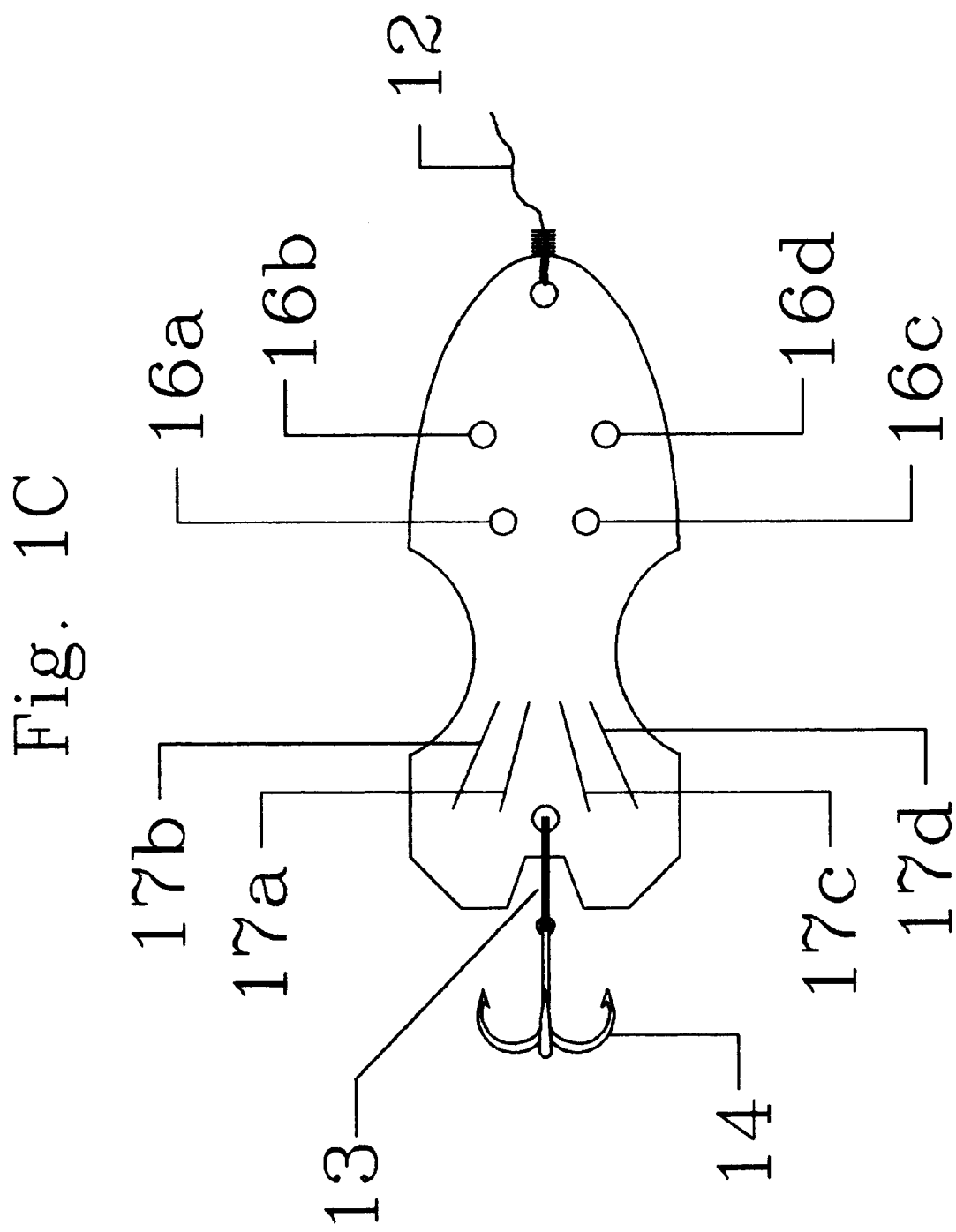
FIG. 1C is a top view of the present invention which includes a more complete depiction of the present invention with the additional components referred to in the summary of the invention including the fishing line 12, attachment device 13, and hook 14.

A typical embodiment and disclosure of the present invention is illustrated in FIGS. 1A, 1B, and 1C attached hereto. The lure presented in this disclosure contains several unique units of design. First as shown in FIG. 1A the lure has two symmetrical cutouts on the lure's sides which are referred to as water channels 1a and 1b. It is believed that these substantially half-circle shaped water channels 1a and 1b channel water past the lure as it is pulled through the water. These water channels 1a and 1b, unlike other fishing lures, channel water past the present invention in such a fashion as to provide the lure with a unique oscillation and tumbling motion.

The lure is defined by a top (18) surface, a bottom (19) surface, a longitudinal center line (24, FIG. 1A), a planar rear portion defining a plane (21, 23, as shown in FIG. 1B), an elliptical front portion (7) bent at an angle of approximately 10° from the plane of the rear portion, a notch (5a) having a pair of opposed angled side edges (5b, 5c) and a back edge (20) and a pair of opposed substantially half circular cutouts (1a,1b) formed in the planar rear portion wherein the half circular shapes define opposed portions of a circumferential side edge. The circumferential side edge is defined by the thickness of the lure and extends around and defines the shape of the lure.

The lure described in this application also contains a bend 9 as shown in FIG. 1B. This bend 9 may be increased or decreased to alter the lure's oscillation or tumbling motion through the water. It is believed that the bend 9 forces water at the lure's surface through water channels 1a and 1b as it is pulled through water by fishing line 12. It is believed that this gives the lure its unique oscillation and tumbling motion in the water. The present invention and preferred embodiment for the purposes described in this application is an angle of approximately 10° in relation to the flat unbent portion 10 of the lure shown by FIG. 1B.

The lure's design also incorporates a notch 5a near the end 11 of the lure. This notch 5a allows for the attachment device 13 which attaches the hook 14 to the lure at hole 2 as shown in FIG. 1A, to be set forward the end 11 of the lure. As a consequence, the hook 14 attached to the lure is actually closer to the lure's end 11 than other lures. This notch 5a also provides a unique oscillation as the lure is pulled through the water. The lure's edges 5b and 5c consist of two lines, which act to channel water. The preferred embodiment and the present invention require these lines 5b and 5c be formed at an angle of approximately 20° degrees to a line which would be drawn perpendicular to notch 5a and extending towards the lure's end 11.

The lure's edges 4a and 4b are two lines that are drawn at 45° angles to the lure's edges 6a and 6b, which are parallel to one another. These linear edges 4a, 4b, 6a, and 6b also create friction between the lure and water in order to produce the unique oscillation of the present invention when it is pulled through the water by the fishing line 12 which is attached to the hole 3 as shown in FIG. 1C.

The front portion of the lure as shown in FIG. 1A consists of a substantially elliptical front portion 7 and contains hole 3 near its front 8 for the attachment of fishing line 12. Moreover, as shown in FIG. 1B, this front portion 7 of the lure is bent at approximately a 10° angle from the lure's otherwise substantially flat surface 10. This bend 9 channels water from the front portion 7 of the lure to and through water channels 1a and 1b, and notch 5a as shown in FIG. 1A. This bend 9 is also responsible for the lure's unique and attractive oscillation and tumbling action when pulled through the water. The bend 9 creates a substantial drag or friction between the lure and water, which is greater than a flat piece of metal. It is believed that this drag or friction creates the lure's unique oscillation and tumbling action.

The lure's surface 15 is beveled or scored to produce spots 16a, 16b, 16c, and 16d, which are substantially circular in shape. The number of spots 16a, 16b, 16c and 16d may be increased or decreased according to the size of lure produce. However, spots 16a, 16b, 16c and 16d reflect light at many angles and increase the lure's attractiveness as it is pulled through the water by fishing line 12.

The lure's surface 15 is also beveled or scored to produce lines 17a, 17b, 17c, and 17d. The number of lines 17a, 17b, 17c, and 17d may be increased or decreased according to the size of lure produced. However, lines 17a, 17b, 17c, and 17d reflect light at many angles and increase the lure's attractiveness as it is pulled through the water by fishing line 12.

We claim:

1. A fishing lure comprising:

a single rigid metal lure having a length, a width, a front portion, a top and bottom surface, a planar rear portion, and a circumferential side edge, said width is substantially less than the length, a first hole located in the front portion for the attachment of a fishing line, a second hole located in the rear portion for the attachment of a hook, said front portion comprising an elliptical nose section bent out of the plane from the planar rear portion at an angle of approximately 10°, a pair of opposed substantially half circular cutouts formed in the planar rear portion wherein the half circular shapes define opposed portions of the circumferential side edge, said rear portion having a notch formed therein, said notch defined by a back edge with a pair of side edges extending therefrom at an angle of approximately 20° from a longitudinal center line of the lure, said notch being configured and located on the end of the rear portion opposite the front portion to channel water passing around the lure, and, said top or bottom surface of said lure having means for reflecting light at a greater number of angles to attract fish comprising a plurality of beveled and scored circular markings or a plurality of beveled and scored lines.

* * * * *